H. DUJARDIN.
ART OF PRESERVING FRUIT AND VEGETABLES.
APPLICATION FILED DEC. 15, 1910.

1,018,812.

Patented Feb. 27, 1912.

UNITED STATES PATENT OFFICE.

HENRI DUJARDIN, OF NEW YORK, N. Y.

ART OF PRESERVING FRUIT AND VEGETABLES.

1,018,812.  Specification of Letters Patent.  Patented Feb. 27, 1912.

Application filed December 15, 1910. Serial No. 597,444.

*To all whom it may concern:*

Be it known that I, HENRI DUJARDIN, a subject of the King of Belgium, residing in the city, county, and State of New York, have invented certain new and useful Improvements in the Art of Preserving Fruit and Vegetables, of which the following is a specification.

My invention more particularly relates to the preservation of fruits and vegetables which must be shipped over long distances.

Very many fruits and vegetables contain considerable quantities of water. Especially is this true of vegetables like lettuce, endive, Brussels sprouts, and the like. In practice it has been found that if such fruits and vegetables are confined in a hermetically sealed case, which will prevent the egress of the developed gases due to the natural decay of such fruits and vegetables or packed in receptacles which will permit the egress of such gases but also permit the deposit of moisture, very rapid decay will take place.

My invention depends upon these observed facts, and, broadly stated, consists in packing such fruits and vegetables in such manner that the evolved gases shall find ready egress, but moisture and external gases prevented from access to such fruits and vegetables.

A number of different means may be employed to carry my invention into effect, and two of these means I have shown in the accompanying drawing which is merely illustrative.

Figure 1:
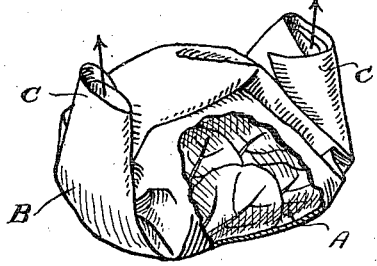
Figure 2:
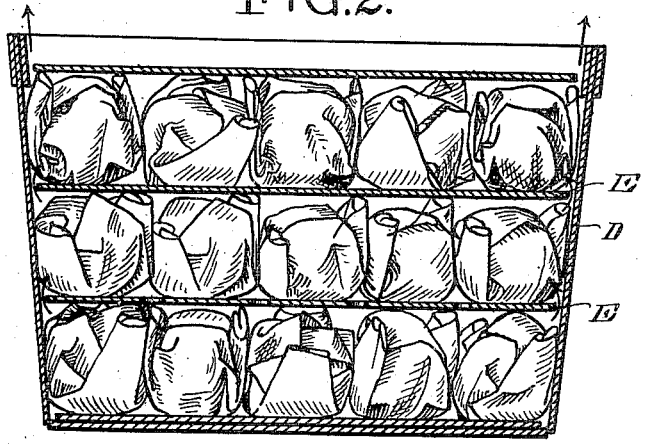
Figure 3:
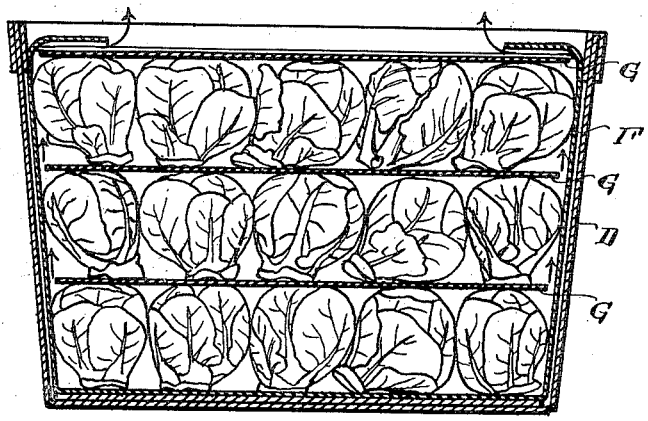

Figure 1 is a perspective view of a simple packing. Fig. 2 is a vertical section showing a receptacle containing a number of such simple packings. Fig. 3 is a view similar to Fig. 2 but shows the vegetables introduced into the packing case without the simple packing.

Referring to Fig. 1: A illustrates the vegetable to be preserved. Surrounding this vegetable and enveloping it is a body impervious to the air. This body may be made of any suitable matter. I find paraffin paper to be well adapted. This paraffin paper is wrapped around the article in such manner as to permit egress of the gases due to the decomposition of the article to be preserved. The arrangement shown in the drawing is well adapted for the purpose. The paper B is turned over the article and then the opposite ends C turned upward so as to form what may be in fact considered chimneys.

I wish it understood that I do not limit myself to the character of the enveloping body or to the way in which it is applied to the article to be preserved, provided that it will serve to keep out moisture.

In Fig. 2 I have shown a basket D, and located in this basket in layers are bodies and wrapping such as disclosed in Fig. 1, and between these bodies partitions E, which have for their purpose to distribute the weight of these bodies. Preferably, the partitions are slightly smaller than the basket so as to allow the egress of gases along the sides of the basket. The partitions may be perforated as indicated in the lower partition, Fig. 2.

With certain fruits and vegetables, particularly those that are hard and do not easily decay, I find that it is not necessary to pack each article or mass of articles with separate coverings, in which case I may use a receptacle shown as in Fig. 3. In this figure the basket D is lined with impervious paraffin paper as shown at F, which covers the bottom and sides of the basket and is turned over the top edges inwardly. In this figure the horizontal partitions G are made of paraffin paper.

If desired, the partitions E of Fig. 2 and partitions G of Fig. 3 may be combined.

In practice, fruits and vegetables packed as above described may be transmitted over long distances requiring anywhere from ten to fifteen days' time and be received in perfect condition.

It should be observed that the pressure of the developed gas within the wrapping acts to prevent the ingress of moist air which would tend to promote decay.

Having thus described my invention, I claim:

1. An improvement in the art of preserving fruit and vegetables, which consists in packing said articles in a covering arranged to permit the egress of the evolved gases, due to the decay of the article, but to prevent the ingress of moisture or external gases.

2. An improvement in the art of preserving fruit and vegetables, which consists in packing such articles in a covering so applied as to permit the egress of the evolved gases, due to the decay of the article, but prevent the ingress of external gases or the deposit of moisture upon the articles to be preserved.

3. An improvement in the art of preserving fruit and vegetables, which consists in packing said articles in a covering of paraffined paper, so applied as to permit the egress of the evolved gases, due to the decay of the article to be preserved, but prevent the ingress of moisture or external gases.

4. An improvement in the art of preserving fruit and vegetables, which consists in packing the article to be preserved in a covering of paraffined paper placed without the article, and folding said paraffined paper over the article in such a manner as to permit the egress of the gases evolved by the article, but prevent ingress of air and moisture.

5. An improvement in the art of preserving fruit and vegetables, which evolve gases of decomposition, which consists in packing the article by placing it upon a body of paraffined paper, then folding the paper over the article to form a closed seam, and then turning up the ends of the paper to form within the folds, outlets for the gases evolved by the article.

6. An improvement in the art of preserving fruit and vegetables, which consists in packing the articles to be preserved in a container constructed in such a manner and of such material, that the pressure of the evolved gases from the article to be preserved will cause said gases to flow from within the container into the atmosphere but oppose, by their pressure, the ingress of the external atmosphere to the article.

In testimony whereof, I affix my signature, in the presence of two witnesses.

HENRI DUJARDIN.

Witnesses:
CHARLES WESLEY DUNN.
HELEN E. KOELSCH.